United States Patent
Korl et al.

(10) Patent No.: US 6,756,028 B2
(45) Date of Patent: Jun. 29, 2004

(54) CONTINUOUS HYDROGENATION PROCESS

(75) Inventors: Peter Korl, Neu-Feffernitz (AT);
Bernhard Maurer, Feistritz/Drau (AT)

(73) Assignee: Degussa AG, Dusseldorf (DE)

( * ) Notice: Subject to any disclaimer, the term of this patent is extended or adjusted under 35 U.S.C. 154(b) by 270 days.

(21) Appl. No.: 09/982,108

(22) Filed: Oct. 19, 2001

(65) Prior Publication Data

US 2002/0052532 A1 May 2, 2002

(30) Foreign Application Priority Data

Oct. 21, 2000 (DE) .......................... 100 52 323

(51) Int. Cl.$^7$ .................... C01B 15/023; C01B 15/037
(52) U.S. Cl. ................. 423/584; 423/588; 423/272
(58) Field of Search ................ 423/272, 584, 423/588

(56) References Cited

U.S. PATENT DOCUMENTS

| | | | |
|---|---|---|---|
| 2,837,411 A | | 6/1958 | Jenney |
| 4,428,922 A | * | 1/1984 | Hopkins ............. 423/588 |
| 4,626,604 A | * | 12/1986 | Hiles et al. ........... 568/881 |
| 5,063,043 A | * | 11/1991 | Bengtsson .......... 423/588 |
| 5,071,634 A | * | 12/1991 | Maunula et al. ........ 423/588 |
| 5,147,628 A | | 9/1992 | Simon et al. |
| 5,169,618 A | * | 12/1992 | Maraschino .......... 423/584 |
| 5,194,242 A | * | 3/1993 | Paoli ................ 423/584 |
| 5,637,286 A | * | 6/1997 | Turunen ............ 423/588 |

FOREIGN PATENT DOCUMENTS

| | | |
|---|---|---|
| DE | 19808385 A1 | 9/1999 |
| DE | 19841843 A1 | 3/2000 |
| EP | 0 111 133 A1 | 6/1984 |
| EP | 0384905 A1 * | 8/1990 ......... C01B/15/023 |
| WO | WO 86/06710 | 11/1986 |

OTHER PUBLICATIONS

US 2003/0086853 A1 Devic Feb. 15, 2001.*
US 2003/0050510 A1 Welp et al Aug. 30, 2001.*
US 2002/0052532 A1 Korl et al Oct. 19, 2001.*
US 2001/0028873 A1 Haas et al Apr. 5, 2001.*
Copy of International Search Report for counterpart application No. PCT/EP 01/09722 dated Dec. 18, 2001.

* cited by examiner

Primary Examiner—Steven Bos
Assistant Examiner—William G. Wright, Sr.

(57) ABSTRACT

A continuous catalytic hydrogenation process, in which a reaction mixture containing the substance to be hydrogenated, the hydrogenation product, hydrogen and the hydrogenation catalyst suspended in the reaction mixture is recirculated in a reactor. Part of the hydrogenation product is removed from the reactor and the substance to be hydrogenated and hydrogen are fed into the reaction. In this process the substance to be hydrogenated and the hydrogen are mixed before entering the reactor. A venturi nozzle is particularly suitable as the mixing device.

18 Claims, 1 Drawing Sheet

CONTINUOUS HYDROGENATION PROCESS

INTRODUCTION AND BACKGROUND

The present invention relates to a continuous catalytic hydrogenation process, in which the hydrogenation catalyst suspended in the reaction mixture is recirculated. This process is particularly suitable for the hydrogenation step in the anthraquinone process for the production of hydrogen peroxide.

In known hydrogenation processes the catalyst is generally used as a fixed bed, as a supported or as a suspended catalyst.

In the fixed bed reactor the catalyst is applied to a support. A great disadvantage of this type of reactor is the slow transfer of the gaseous hydrogen into the solution and on to the catalyst surface.

Various ways of bringing the hydrogen into solution more rapidly have been suggested. U.S. Pat. No. 2,837,411 describes the saturation of the solution with hydrogen before hydrogenation in a separate tank. Considerable investment costs and the fact that only a fraction of the hydrogen required in the reaction can be brought into solution make this route unattractive.

Even the pre-mixing of the hydrogen with solution to be hydrogenated by means of a static mixer, as described in U.S. Pat. No. 4,428,922, leads only to a slight improvement, since the hydrogen bubbles coalesce on contact with the inserts in the reactor.

When using a supported or suspended catalyst, as described in EP-A-111 133, these disadvantages do not occur.

In EP-A-111 133 it is shown that in a continuous co-current catalytic hydrogenation process for the production of hydrogen peroxide by the so-called anthraquinone process, the efficiency of the hydrogenation can be increased if this is carried out in a loop reactor at flow velocities of more than 3 m/s, preferably 4–7 m/s. The flow velocity is selected such that the gas/liquid interface remains as produced at the beginning of the reactor. In this way the hydrogen can react completely along the reaction zone and no separations occur between the gas and the liquid phase.

It is disadvantageous in this process described in EP-A-111 133 that the mixing devices for the substance to be hydrogenated and the hydrogen lead to large pressure drops, particularly when tubular reactors are to be operated at the high circulating flows and circulation rates specified, and therefore a higher input of energy is necessary.

An object of the present invention was therefore to overcome the problems associated with prior known processes and thereby increase the efficiency of a hydrogenation process in which a reaction mixture containing the substance to be hydrogenated, the hydrogenation product, hydrogen and the catalyst suspended in the reaction mixture, is recirculated.

SUMMARY OF THE INVENTION

The above and other objects can be achieved in accordance with the present invention by a process where the substance to be hydrogenated, the hydrogenation product, hydrogen and the hydrogenation catalyst suspended in the reaction mixture are recirculated in a reactor. In carrying out the process, part of the hydrogenation product is removed from the reactor and the substance to be hydrogenated and the hydrogen are fed into the reactor in a special way.

Namely, it is a feature of the present invention that the substance to be hydrogenated and the hydrogen are mixed before entering the reactor.

As a result, the pressure drop in the hydrogenation reactor is reduced quite substantially, which leads to a reduction in the energy costs. Alternatively, the total circulating quantity can be increased at a constant speed of the circulating pump, which leads to a higher velocity and space-time yield and thus, ultimately, to an increase in capacity.

This result was surprising for the hydrogenation reactor described above, in which the majority of the reaction mixture is recirculated and only a small part is removed from the reactor, and accordingly the quantity of substance to be hydrogenated and of hydrogen being fed into the reactor is small in comparison with the quantity of the reaction mixture being recirculated.

As set forth in EP-A-111 133, the conversion in the type of reactor described above is greatest when the gas/liquid interface produced is maintained along the reaction zone. This is the case when the mixing of gas and liquid phase takes place at flow velocities of at least 3 m/s. Outside the hydrogenation reactor, the flow velocities are clearly lower than 3 m/s. In consequence, it should be expected that no transfer of the dispersion into the reactor should take place, accompanied by a reduced conversion. However, it has now been shown that, even when the gas and liquid phase are premixed upstream of the hydrogenation reactor, the conversion is not reduced.

The process according to the invention for the mixing of substance to be hydrogenated and hydrogen can preferably be carried out in that the gas bubbles produced in the mixing device have a maximum diameter of 2.5 mm, particularly preferably less than 1.5 mm, to allow a rapid transfer into the liquid phase.

Possible mixing devices with which this size of gas bubbles can be achieved are e.g. perforated plates, frits, nozzles or static mixers.

Particularly suitable for the process according to the invention is a venturi nozzle. This known device has a small pressure drop compared with other mixing devices, and is largely maintenance-free. As a function of the energy input and the volume flow, the nominal width of the channel is adjusted so that the maximum gas bubble diameter does not exceed 2.5 mm.

In addition to the bubble size, the stability of the bubbles is also significant. The bubbles should be prevented from coalescing, which would result in inadequate distribution of the hydrogen in the liquid phase.

A particularly preferred embodiment of the process according to the invention is therefore to carry out the hydrogenation in a coalescence-inhibited system. Coalescence-inhibited systems are to be understood as those gas/liquid systems in which the gas bubbles retain their size if no external influence is present. Interface-influencing values of the liquid, such as viscosity and specific surface tension, are responsible for this, together with the nature of the gas.

As described in EP-A-221 931, the working solutions used in the AO process for the production of hydrogen peroxide as the liquid phase fulfil the conditions for a coalescence-inhibited system when the sum quotient of all interfacial surface tensions of the components involved reaches at least 16 mN/m, preferably 17 to 25 mN/m.

In EP-A-221 931, oxygen or an oxygen/nitrogen mixture is described as the gas phase. It can also be shown, by a simple test, that working solutions and hydrogen or a hydrogen-containing gas form a coalescence-inhibited system when the above-mentioned condition for the sum quotient of all interfacial surface tensions of the components involved is fulfilled. Thus, it can be ensured by an appropriate choice of the components of the reaction system and their relative quantities that, when hydrogen and working solution are pre-mixed, a coalescence-inhibited system is formed and enters the hydrogenation reactor as such.

In order to achieve a quantitative hydrogenation as far as possible, the gas portion of the premix of hydrogen and substance to be hydrogenated should be over 30 vol. %, preferably over 40 vol. %. The range is particularly preferably between 60 and 80 vol. %.

The maintenance of a coalescence-inhibited system during the course of the reaction is favoured by hydrogenation reactors that are free from inserts which, according to experience, lead to coalescence of the gas bubbles.

Particularly suitable types of reactors, the reaction chamber of which is free from inserts with a gas-splitting function, apart from the distributing device, are in particular stirred vessels, gas-lift reactors, fluidized-bed reactors or loop reactors for hydrogenation by the AO process for the production of hydrogen peroxide.

BRIEF DESCRIPTION OF DRAWING

The present invention will be further understood with reference to the accompanying FIG. 1 which is a schematic representation of a hydrogenation reaction suitable for practice of the described process.

DETAILED DESCRIPTION OF INVENTION

Figure 1:
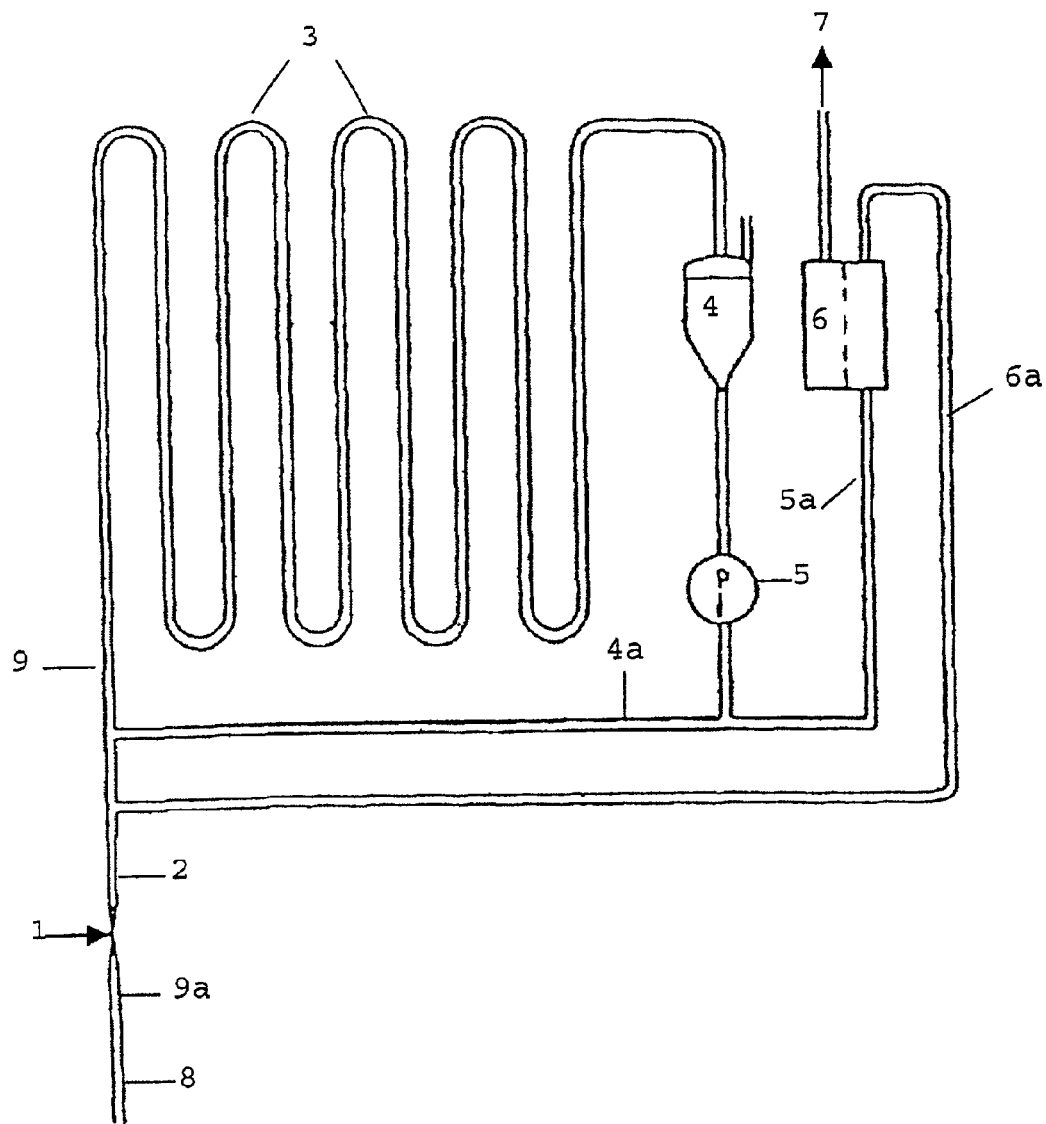

The process according to the invention is particularly suitable in the above-mentioned process for the catalytic hydrogenation of substituted anthraquinones or mixtures of substituted anthraquinones,
the partially ring-hydrogenated alpha- and beta-tetrahydro derivatives thereof and mixtures of a) and b)
to the corresponding anthrahydroquinones and tetrahydroanthrahydroquinones.

In particular, 2-alkyl-substituted anthraquinones, the alkyl residue of which can contain 1 to 8 C atoms and can be linear or branched, are used. Examples of these are 2-ethyl, 2-amyl und 2-tert.-butyl anthraquinone and their tetrahydro derivatives.

Other compounds that can be advantageously hydrogenated by the process according to the invention are olefins, aromatic and heteroaromatic rings, carbonyl compounds and nitriles.

The substance to be hydrogenated can be introduced as such or in solution. Anthraquinones are preferably dissolved in a mixture of solvents containing a quinone solvent and a hydroquinone solvent.

Known quinone solvents are benzene, tert.-butylbenzene, tert.-butyltoluene, trimethylbenzene, polyalkylated benzenes and methylnaphthalene.

Known hydroquinone solvents are alkyl phosphates, alkyl phosphonates, nonyl alcohols, alkylcyclohexanol esters, N,N-dialkyl carbonamides, tetraalkyl ureas, N-alkyl-2-pyrrolidones.

The premixing of hydrogen and liquid phase according to the invention is preferably performed in the catalytic hydrogenation of substituted anthraquinones by the AO process in the insert-free type of reactor described. In this process, the substance to be hydrogenated, the hydrogenation product, hydrogen and the catalyst suspended in the reaction mixture are recirculated, part of the hydrogenation product is removed from the reactor and the substance to be hydrogenated and hydrogen are fed into the reaction.

The removed part, which contains the hydrogenated product, is oxidized in a downstream reaction step, wherein hydrogen peroxide is formed, and the substance to be hydrogenated is re-formed. The hydrogen peroxide is then extracted and the substance to be hydrogenated is fed back into the hydrogenation again.

A possible embodiment of a hydrogenation reactor with premixing of the hydrogen is schematically shown in FIG. 1.

The three-phase mixture 9, containing a solution with the substance to be hydrogenated and already hydrogenated, hydrogen and the suspended hydrogenation catalyst, is circulated, starting from a pump receiver 4, via the line 4a, by means of a circulating pump 5, through the loop reactor 3. A partial stream of this solution is passed via the line 5a through a filter device 6. This stream is again divided at this point: catalyst-containing solution is fed back via the line 6a to the loop reactor 3, while the catalyst-free product stream 7 is removed from the circulation. Fresh catalyst-free solution 9a, containing the substance to be hydrogenated, is introduced at the inlet point 8.

In the process according to the invention, the hydrogen 1 is dispersed in the catalyst-free liquid phase 9a in the gas inlet point 2 preferably designed as a venturi nozzle, and only then combined with the catalyst-containing partial streams 4a and 6a.

Operating tests in a full-scale AO plant have shown that the pressure drop of a hydrogenation reactor could be substantially reduced or, at a constant speed of the circulating pump, the total circulating quantity could be increased by approx. 30%. As a result of the increased circulating quantity, a higher catalyst concentration profile was therefore established, so that it was possible to increase the reactor capacity by approx. 15%.

Alternatively, by reducing the speed of the circulating pump, if no increase in capacity is intended, an energy saving of approx. 40% can be calculated.

Further variations and modifications of the foregoing will be apparent to those skilled in the art and are intended to be encompassed by the claims appended hereto.

German priority application 100 52 323.4 is relied on and incorporated herein by reference.

We claim:

1. A continuous catalytic hydrogenation process, comprising recirculating a reaction mixture containing the substance to be hydrogenated, hydrogenation product, hydrogen and hydrogenation catalyst suspended in the reaction mixture in a reactor, removing part of the hydrogenation product from the reactor, mixing together the substance to be hydrogenated and the hydrogen before entering the reactor and then feeding the substance to be hydrogenated and hydrogen into the reactor.

2. The process according to claim 1, further comprising mixing of the substance to be hydrogenated and hydrogen so that the diameter of gas bubbles produced thereby is no more than 2.5 mm.

3. The process according to claim 2, further comprising mixing of the substance to be hydrogenated and hydrogen so that the diameter of gas bubbles produced thereby is less than 1.5 mm.

4. The process according to claim 1, wherein a venturi nozzle, a perforated plate or flit is used for mixing said substance to be hydrogenated and the hydrogen.

5. The process according to claim 2, wherein a venturi nozzle, a perforated plate or flit is used for mixing said substance to be hydrogenated and the hydrogen.

6. The process according to claim 3, wherein a venturi nozzle, a perforated plate or flit is used for mixing said substance to be hydrogenated and the hydrogen.

7. The process according to claim 1, wherein the substance to be hydrogenated and hydrogen form a system that is coalescence-inhibited.

8. The process according to claim 2, wherein the substance to be hydrogenated and hydrogen form a system that is coalescence-inhibited.

9. The process according to claim 3, wherein the substance to be hydrogenated and hydrogen form a system that is coalescence-inhibited.

10. The process according to claim 4, wherein the substance to be hydrogenated and hydrogen form a system that is coalescence-inhibited.

11. The process according to claim 7, further comprising wherein systems in which the sum quotient of all specific interfacial surface tensions of the components involved in the system reaches a value of at least 16 mN/in are used as the coalescence-inhibited systems.

12. The process according to claim 1, wherein the hydrogen and substance to be hydrogenated form a mixture that possesses a gas proportion of 40 vol. % to 80 vol. %.

13. The process according to claim 1, wherein the reactor is free from inserts.

14. The process according to claim 1, wherein the reactor is a stirred vessel, a gas-lift reactor, a fluidized-bed reactor or a loop reactor.

15. The process according to claim 1, further comprising using substituted anthraquinone or a mixture of substituted anthraquinones and/or ring-hydrogenated tetrahydro derivatives thereof as the substance to be hydrogenated.

16. The process according to claim 1, further comprising in that the substance to be hydrogenated is introduced as such or in solution.

17. The process according to claim 2, further comprising in that the substance to be hydrogenated is introduced as such or in solution.

18. The process according to claim 4, further comprising in that the substance to be hydrogenated is introduced as such or in solution.

* * * * *